United States Patent [19]
Erlichman

[11] 3,832,721
[45] Aug. 27, 1974

[54] LOCKOUT MECHANISM FOR AUTOMATIC TRIM ASSEMBLY RETURN MECHANISM

[75] Inventor: Irving Erlichman, Wayland, Mass.

[73] Assignee: Polaroid Corporation, Cambridge, Mass.

[22] Filed: Dec. 3, 1973

[21] Appl. No.: 420,914

[52] U.S. Cl............... 354/21, 354/28, 354/37, 354/41, 354/187, 352/78 C
[51] Int. Cl............... G03b 19/04, G03b 19/18
[58] Field of Search........... 354/21, 28, 37, 41, 187; 352/78 C

[56] References Cited
UNITED STATES PATENTS

| | | | |
|---|---|---|---|
| 3,312,158 | 4/1967 | MacMillin et al. | 354/21 |
| 3,604,327 | 9/1971 | Hirata | 354/21 |
| 3,613,535 | 10/1971 | Hirabayash | 354/41 |
| 3,678,827 | 7/1972 | Eagle | 354/41 |

Primary Examiner—Robert P. Greiner
Attorney, Agent, or Firm—William A. Danchuk

[57] ABSTRACT

A lockout mechanism for an automatic normal return mechanism for a manually adjustable trim assembly is provided. In a preferred embodiment, the lockout mechanism is employed in conjunction with a foldable camera having an automatic exposure control system. The camera includes a number of housing members interconnected for movement between erected and folded configurations. The automatic normal return mechanism is disposed within one of the housing members and operates in response to return of the camera to its folded configuration. The lockout mechanism precludes the return of the trim assembly to its normal position when the film being used within the camera requires a given trim setting to correct for specific exposure parameters due to film speed variations.

27 Claims, 5 Drawing Figures

3,832,721

LOCKOUT MECHANISM FOR AUTOMATIC TRIM ASSEMBLY RETURN MECHANISM

BACKGROUND OF THE INVENTION

Automatic return mechanism for manually adjustable trim assemblies have been previously disclosed in Ser. No. 246,851 by Edwin H. Land et al and in copending application for United States Patent entitled "Automatic Return Mechanism For An Exposure Trim Assembly" by Lawrence M. Douglas, filed Aug. 25, 1972, Ser. No. 300,819, both being assigned to the assignee of the present application. This invention is concerned with an improvement to automatic return trim assembly mechanisms similar to those noted above.

SUMMARY OF THE INVENTION

The present inventin is addressed to a preventing mechanism for inactivating an automatic trim assembly return as provided in conjunction with a camera having an automatic exposure control system.

In one preferred embodiment, the invention is employed in conjunction with a camera having a plurality of housing members interconnected for movement between an erected configuration for forming an exposure chamber, and a folded configuration for convenient carrying and storage.

An exposure control housing, formed as one of the housing members, is pivotally coupled to the front of the camera. The exposure control housing contains the electronic components of the camera's automatic exposure control system for automatically regulating the exposure of photosensitive material contained within the camera. Also included within the exposure control housing is a manually actuated trim assembly, providing the camera user with about a 1½ stop optional exposure adjustment above or below the exposure value established automatically by the camera's exposure control system. The trim assembly provides the camera user with the possibility of lightening or darkening a photograph to his personal taste, or to accommodate for unusual lighting situations such as backlighting, highlights or the like.

The trim assembly is linked to a trim return mechanism which automatically returns the trim assembly to a predetermined normal position in response to the folding of the camera. While such an automatic trim return mechanism functions well under normal circumstances, it does not easily provide for a provision in which the trim assembly is used to "correct" for film which may require an exposure correction factor due to film speed variations. The film employed within the camera of the present invention is manufactured within a narrow range of exposure limits. By far the majority of such film falls directly in the middle of the range and correct exposure is provided by the exposure control system. While the possibility is minimized, film may be produced which is within the strict range of exposure limits but which is not directly within the middle of the range. Therefore, in order to provide the camera user with the best possible results, the trim assembly may be used to bring this "incorrect" film into the direct middle of the range for optimum exposure conditions.

If the trim assembly is employed to provide an adjustment or correction factor for a quantity of film which requires a correcting exposure parameter, then it would be convenient not to change the trim assembly from its trimmed state after folding the camera. Moreover, if the film needs no such adjustment or correction factor, and the trim assembly is used for unusual lighting conditions, then convenience would dictate the automatic return of the trim assembly to its predetermined normal position in response to camera folding.

The automatic normal return preventing mechanism according to the present invention renders the trim return mechanism inoperative when the film being used within the camera requires a given manually introduced trim setting to correct for specific exposure parameters. Conversely, should the film being used require no such given trim setting then the preventing mechanism is bypassed and return of the trim assembly to its normal position is permitted.

One object and feature of the present invention is to provide a preventing mechanism for locking out an automatic normal return mechanism for a manually adjustable trim assembly used in conjunction with a camera having an automatic exposure control system.

Another object and feature of the present invention is to provide a normal trim assembly return prevent mechanism for a trim assembly rendering the trim return assembly temporarily inoperative during select occasions of camera use and subsequently, for rendering the trim return assembly operative during other occasions of camera use.

Still a further object and feature of the present invention is to provide a camera having a trim assembly and a trim assembly return and preventing mechanism operative to return the trim assembly to a predetermined normal position in response to a predetermined operation of the camera when the film being used within the camera requires no given trim setting to correct for specific exposure parameters, the preventing mechanism being operative to prevent the return of the trim assembly to its normal position when the film used does require an additional exposure parameter introduced via a given trim setting.

Other objects and features of the invention will in part be obvious and will in part appear hereinafter.

The invention accordingly comprises the apparatus possessing the construction, combination of elements and arrangement of parts which are exemplified in the following detailed disclosure, and the scope of the application which will be indicated in the claims.

BRIEF DESCRIPTION OF THE DRAWINGS

For a fuller understanding of the nature and objects of the invention, reference should be made to the following detailed description taken in connection with the accompanying drawings wherein.

DETAILED DESCRIPTION OF THE INVENTION

Figure 1:
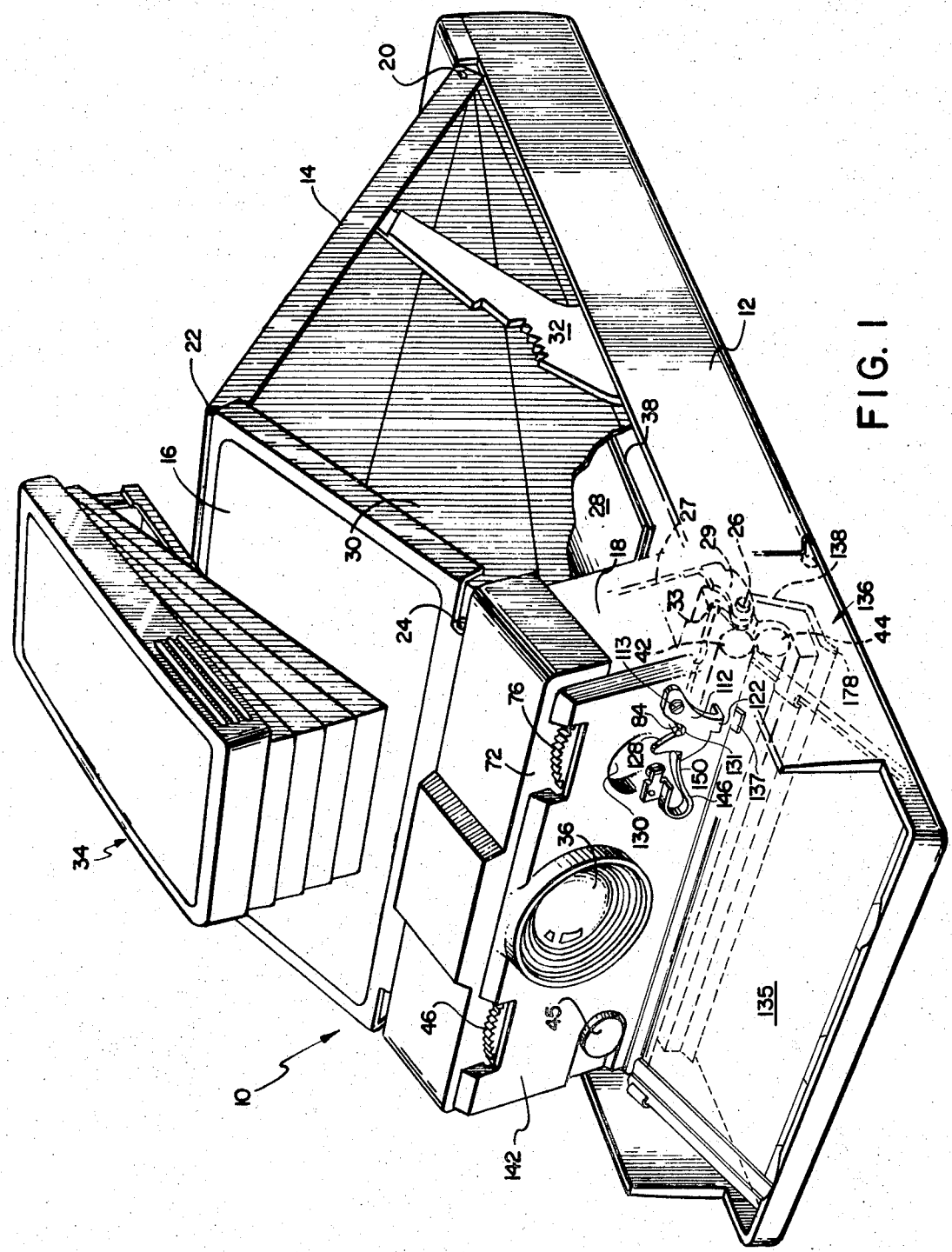
FIG. 1 is a pictorial representation of a single-lens reflex camera according to a preferred embodiment of the invention shown in its erected state with portions broken away to reveal internal structure.
Figure 2:
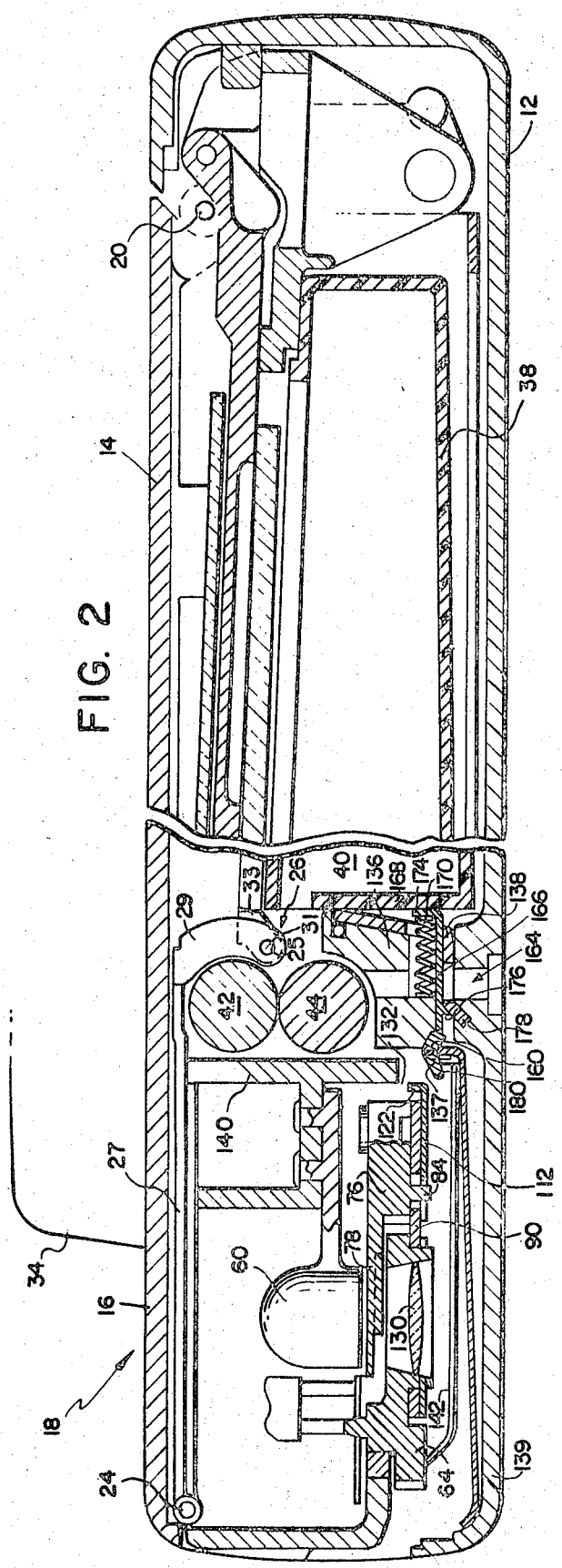
FIG. 2 is a side elevational fragmentary view of the camera of FIG. 1 in its folded state.

Referring to FIG. 1, an automatic camera incorporating the features of the present invention is illustrated generally at 10. Camera 10 is shown in an erected configuration suited for exposing a photosensitive film unit contained therein. The camera 10 structure includes a bottom housing section 12, a rear housing section 14, a top housing section 16, and a front exposure control housing 18. Sections 12, 14, 16, and 18 are pivotally linked to each other about respective hinge axes 20, 22, 24, and 26 and are movable between the erected configuration of FIG. 1 and the compact folded configuration shown in FIG. 2.

When erected, sections 12, 14, 16, and 18 co-operate to define four sides of a six-sided exposure chamber 28, the remaining sides of the chamber being enclosed by a flexible bellows 30 constructed of any suitable opaque material. When camera 10 is in its erected configuration, rear housing section 14 is supported by erecting linkages as at 32 in a position angularly extending from bottom section or base 12 at axis 20. As a result of this connection, top section 16 is angularly oriented between hinges 22 and 24 to form an upper surface of the exposure chamber.

Positioned upon top housing section 16 is a viewfinder apparatus shown generally at 34. Viewfinder 34 and its related internal components are described in detail in a copending application for United States Patent by James G. Baker, entitled "Reflex Camera and Viewing Device," Ser. No. 98,356, filed Dec. 15, 1970 and assigned in common herewith. Viewfinder 34 is constructed having movable components which permit its erection (see FIG. 1) and its collapse (see FIG. 2).

When camera 10 is erected, exposure control housing 18 is withdrawn from its nested orientation within base 12 (see FIG. 2) and is moved to position an optical-taking lens assembly 36 for making an exposure. During its erection, exposure control housing 18 is rotated about axis 26, located along a forward portion of base 12. Pivotal support for housing 18 is provided by a hinge bracket 27 fixed to a rear casting 140 of housing 18 (see FIG. 5). Hinge bracket 27 is configured having a generally C-shaped extension on each side of camera 10 as at 29. Extension 29 includes a bore 25 located at its lower extremity. A pin 31 extends through bore 25 and into a second bore (not shown) formed within a bracket 33 which supports extension 29.

Base 12 is configured to receive and support a disposable film-retaining cassette structure 38 at the bottom of exposure chamber 28. Cassette structure 38 is of a generally rectangular configuration and retains a plurality of stacked film units, the uppermost one of which is positioned in coincidence with the exposure plane of camera 10. Formed on the forwardmost peripheral side of cassette 38 is an egress opening or slot 40 through which the uppermost film unit is removed for processing following its exposure.

Described in detail in a United States Patent by Edwin H. Land, U.S. Pat. No. 3,415,644 entitled "Novel Photographic Products and Processes," the film units contained within cassette 38 include all the materials necessary to produce positive photographic prints. A rupturable container of processing fluid (not shown) secured to the photosensitive composite is located in a position such that it may be easily withdrawn through slot 40. Upon exiting through slot 40, the uppermost film unit is engaged by a pair of pressure-applying rollers 42 and 44. Rollers 42 and 44 are supported for rotation by a supporting structure 136 (see FIG. 2), secured to base 12. Supporting structure 136 includes a roller bracket 138 to which rollers 42 and 44 are connected. Rollers 42 and 44 function to rupture the container of processing fluid and dispense the same along the photosensitive composite.

Pivotally connected to the fowardmost portion of base 12 is a light baffle member 135. A spring (not shown) is connected between baffle member 135 and its pivot (not shown) for automatically erecting member 135 to a position shown in FIG. 1 when camera 10 is erected. When erected, baffle member 135 provides a light shield or shade for the exiting film unit. The exiting film unit passes through an exit slot 139 (see FIG. 2) provided at the forwardmost bottom portion of base housing 12. Due to the specific configuration of the film unit, shading is necessary in order to prevent actinic light from "piping" through the film unit and clouding that portion of the film unit which has not yet passed through rollers 42 and 44. Located on the rearward portion of baffle member 135 is a pivotally movable extension 137, the exact function of which will become more apparent below. For a fuller understanding of the nature and operation of baffle member 135, reference should be made to a copending application of United States Patent entitled "Self-Developing Camera System" by Richard R. Wareham and Richard Paglia, Ser. No. 246,703, filed Apr. 24, 1972 and assigned in common herewith.

Exposure control housing 18, positioned at the front of camera 10, contains all the necessary components for controlling the exposure of photosensitive material. These components generally include a shutter assembly, a shutter release button 45, focusing mechanism, and a photosensing system for automatically determining the correct exposure for a given scene to be photographed.

Figure 5:
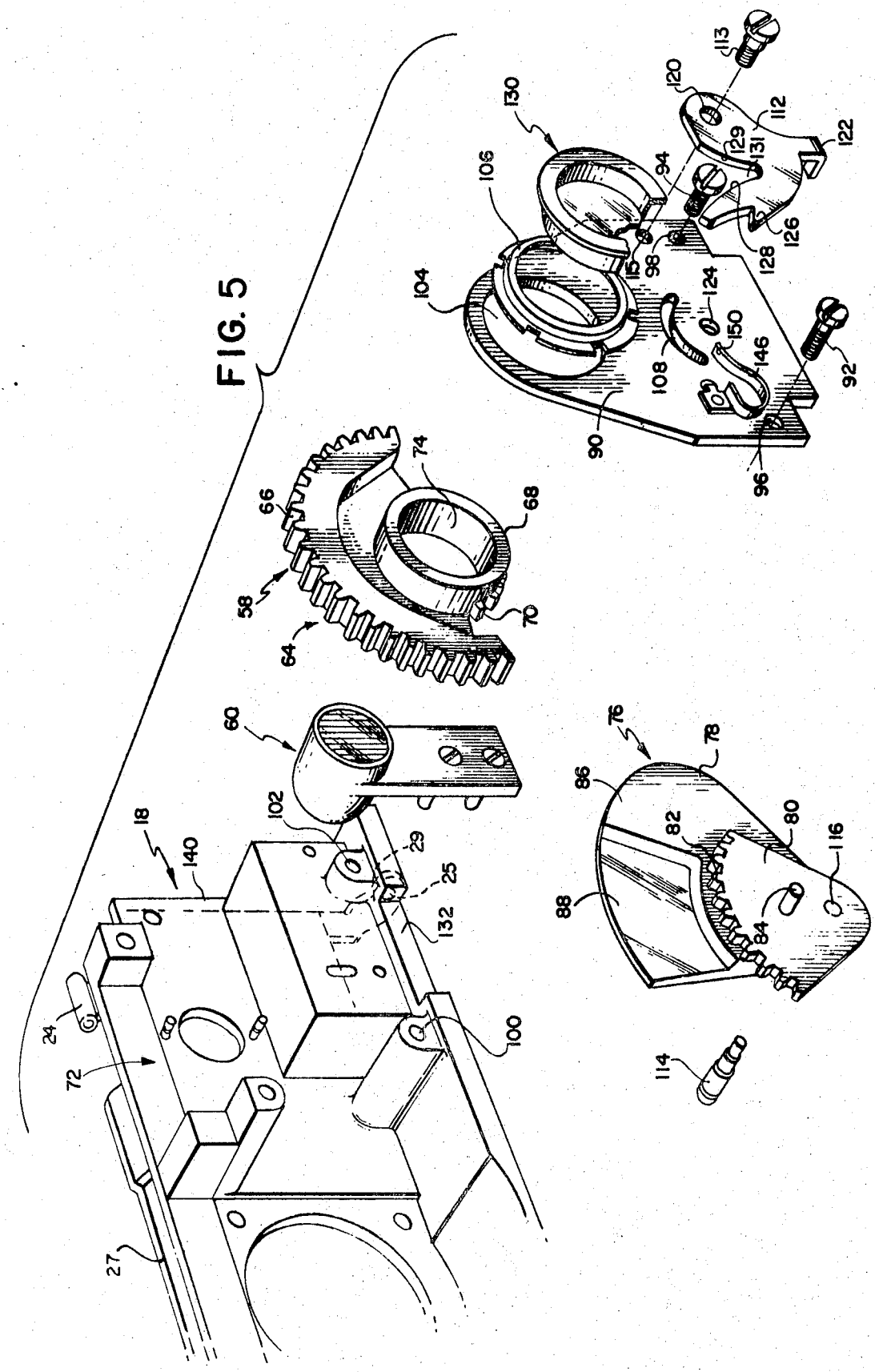
FIG. 5 is an exploded perspective of a trim assembly incorporated within the camera of FIG. 1.

Referring additionally to FIG. 5, the internal components of trim assembly 58 are revealed in more elaborate detail. Positioned on rear casting 140 of exposure control housing 18 is a photocell lens 60. Photocell lens 60 is a forward component of a photosensing system, the remaining components of which are positioned within housing 18. Photocell lens 60 directs light from a scene into a photosensing system for regulating exposure in accordance with scene brightness levels. Positioned in front of photocell lens 60 are the individual components of trim assembly 58.

Manual adjustment of trim assembly 58 is carried out through the rotation of a trim wheel shown generally at 64. Wheel 64 is formed having a segmented gear portion 66, a hollowed cylindrical axial portion 68 and a lower geared portion 70. The uppermost part of segmented gear portion 66 extends through an opening 72 formed within rear casting 140 of exposure control housing 18. Trim wheel 64 may be rotated by the camera operator by virtue of the extension of portion 66 through the top of housing 18. The inner diameter of hollowed portion 74 of cylindrical portion 68 is substantially equal to that of photocell lens 60. Accordingly, light from a scene is permitted to pass directly through trim wheel 64 and into photocell lens 60.

Positioned between lens 60 and trim wheel 64 is a movable trim wedge 76. Trim wedge 76 is formed having upper and lower portions 78 and 80, respectively.

Lower portion 80 is formed having a geared portion 82 engageable with lower geared portion 70 of trim wheel 64. Upper portion 78 of trim wedge 76 is configured having two optically translucent portions 86 and 88. Translucent portions 86 and 88 are formed of a filtering material having selected different transmissibilities. These portions 86 and 88 are moved into and out of covering relationship with photocell lens 60 in response to the manual rotation of trim wheel 64. Additionally included on trim wedge 76 is a trim reset plate pin 84, the specific employment of which will be discussed below.

Trim assembly 58 provides the camera user with a 1½ stop darken to a 1½ stop lighten trim. For instance, when photocell lens 60 is almost all covered by translucent portion 88, trim assembly 58 is in a normal setting. From this position, trim wedge 76 may be rotated so that lens 60 is almost all uncovered, the trim assembly 58 passing through the 1½ stops of darken trim settings depending upon the precise positioning of wedge 76. Similarly, trim wedge 76 may be rotated from its normal position to one in which portion 88 almost covers all of lens 60, passing through the 1½ settings of lighten settings.

Trim wheel 64 and trim wedge 76 are pivotally supported by a mounting plate 90. Mounting plate 90 is secured to exposure control housing 18 by two bolts 92 and 94, extending, respectively, through holes 96 and 98. Bolts 92 and 94 engage threaded holdes 100 and 102 formed within rear casting 140.

Located on the upper portion of mounting plate 90 is a trim wheel mounting hole 104. Hole 104 is configured as a bearing surface for supporting cylindrical portion 68 of trim wheel 64. Cylindrical portion 68 is retained within hole 104 by a ring 106 frictionally retained over the front of portion 68. Positioned in front of ring 106 is a glass lens and casing assembly 130. Assembly 130 is mounted through front coverplate 142 (see FIG. 1) of exposure control housing 18 and provides a transparent protective seal for the components of trim assembly 58.

Mounting plate 90, secured to rear casting 140 of housing 18, is configured to pivotally support both trim wedge 76 on its rearward side and a trim reset plate 112 on its forward side. An arcuate slot 108, formed within mounting plate 90, is configured to receive trim reset plate pin 84 of trim wedge 76. Pin 84 extends through arcuate slot 108 and engages a slot 131 formed within reset actuator 112. Pivotal support for trim wedge 76 is provided by a wedge pivot or stud 114, extending through a hole 116 formed with wedge 76 and supported from bore 124 formed within mounting plate 90. Reset actuator 112 is pivotally supported on mounting plate 90 by a pin 113 extending through a bore 120 formed in actuator 112 to a bore 115 formed in plate 90. Actuator 112 includes a foot portion 122, an extension 126, a first cam surface 128, a second cam surface 129 and a slot 131. Slot 131 is located as to receive trim pin 84 of trim wedge 76. Mounted on the left side of mounting plate 90 is a leaf spring 146. Leaf spring 146 is engageable at its end 150 with extension 126 of reset actuator 112 for biasing actuator 112 in a counterclockwise direction about pivot 113 during select portions of its movement. When wedge 76 is rotated about pivot 114, pin 84 moves along arcuate slot 108 causing rotation of trim reset actuator 112 due to the connection between pin 84 and slot 131.

As may be readily evidenced from the foregoing, movement of pin 84 within arcuate slot 108 rotates reset actuator 112 counterclockwise about its pivot 113. Specifically, movement of trim wedge 76, to either a lighten or darken position causes pin 84 to leave slot 131 of acutator 112 and ride along either one of cam surfaces 128 or 129. Should trim assembly 58 be lightened, pin 84 is pivoted to the left side of slot 108 and engages cam surface 128 of acutator 112. Similarly, a darkening of trim assembly 58 causes pin 84 to move to the right side of slot 108 thereby engaging cam surface 129. In both cases, however, movement of pin 84 along either cam surface 128 or 129 cams actuator 112 counterclockwise about pin 113. A counterclockwise rotation of actuator 112 moves foot 122 downward into a slot 132 provided in the lower portion of rear casting 140 of housing 18. When in this position, foot 122 provides for the return operation of trim assembly 58. In particular, movement of foot 122 upwardly results in a clockwise rotation of actuator 112 toward its untrimmed state. The specific details incorporated in the return of trim assembly 58 will become apparent as this discussion continues.

Should the camera user desire to adjust the trim to change the exposure parameters of the camera's exposure control system, he merely rotates trim wheel 64 from segmented gear portion 66. Since a function parity exists between both the lighten and darken operations of trim assembly 58, only one of the two will be discussed, i.e., the lighten operation. In order to provide for a lighten trim, the camera user rotates trim wheel 66 a select amount in a clockwise direction. Due to the geared connection between trim wheel 64 and trim wedge 76, clockwise rotation of the former results in a counterclockwise rotation of the latter. Accordingly, translucent portions 88 and 86 are selectively placed in front of photocell lens 60, and the camera's photosensing system operates in accordance with the "lower" light levels it "sees." Counterclockwise rotation of trim wedge 76 about pivot 114 results in a similar movement of trim reset plate pin 84 along arcuate slot 108. Due to the engagement of pin 84 with cam surface 128, reset acutator 112 is cammed in a counterclockwise manner about pin 113, thereby moving foot 122 into slot 132 of exposure control housing 18. The distance which foot 122 extends into slot 132 is dependent upon the amount to which trim assembly 58 has been adjusted.

Figure 3:
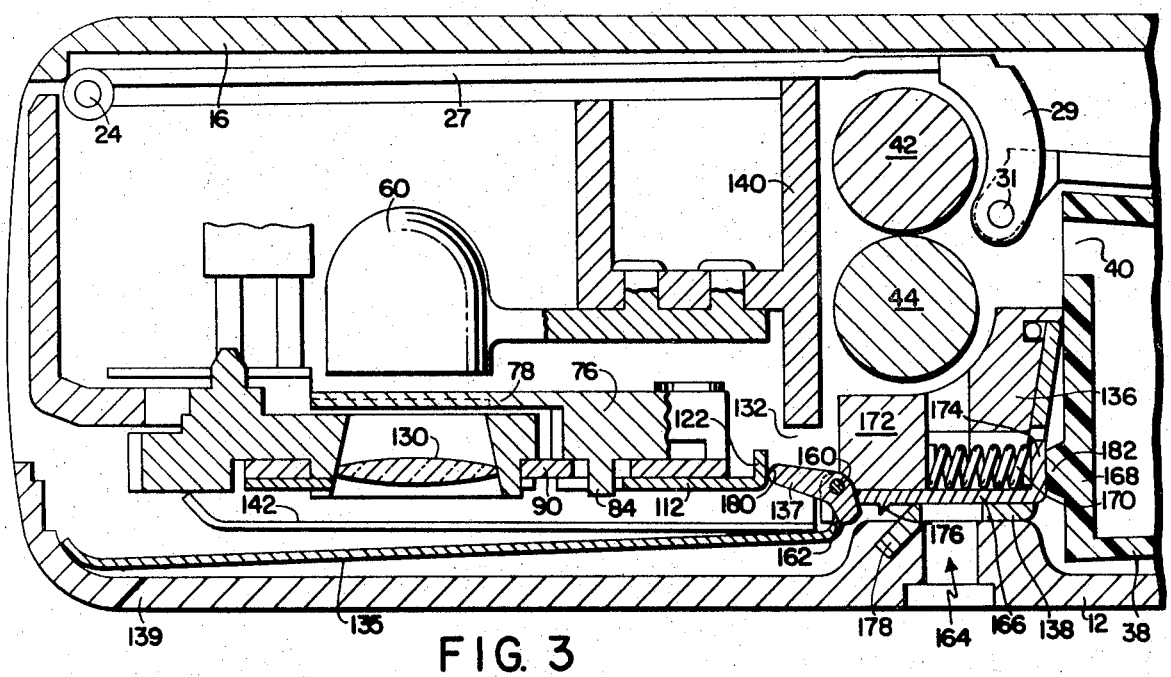
FIG. 3 is an enlarged fragmentary view of the apparatus of the present invention as shown in FIG. 2 during one mode of operation.
Figure 4:
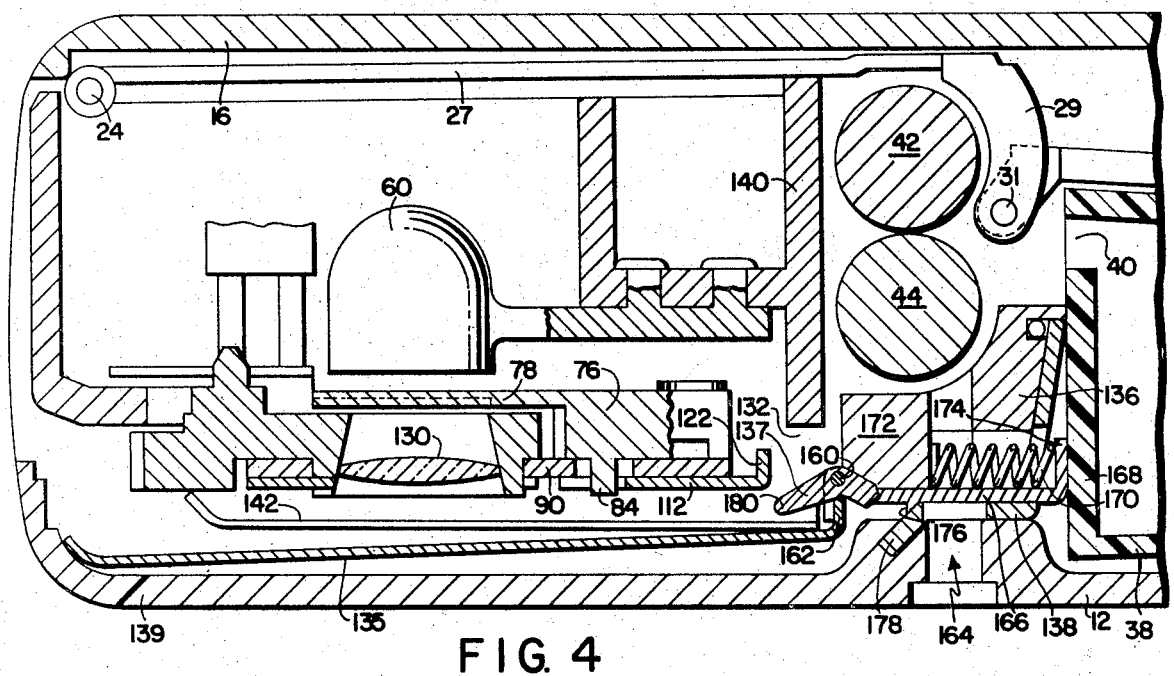
FIG. 4 is an enlarged fragmentary view of the apparatus shown in FIG. 3 during another mode of operation.

Looking to FIGS. 3 and 4, there is shown both the actuating mechanism for returning trim assembly 58 to its predetermined normal position and its association with the selective actuable preventing mechanism for preventing its return. As previously noted, the extension of foot 122 into slot 132 provides for the return operation of the trim assembly. Specifically, foot 122 is contacted by extension 137 pivotally mounted on a rearward portion of light shield 135. Extension 137 is movably mounted on a raised portion 162 of light shield 135 through a pin 160 and is movable between a first position shown in FIG. 4 and a second position shown in FIG. 3. The return of the trim assembly 58 through the trim return mechanism, two components of which are foot 122 and extension 137, is dependent upon the rotational positioning of extension 137 relative to foot 122 when the camera 10 is folded. In particular, trim assembly 58 may be returned to its normal predetermined position only when extension 137 is in a position in which it is engageable by foot 122 when camera 10 is folded, a position best shown in FIG. 3. Similarly, the trim assembly will not be returned to its predetermined normal position when extension 137 is in a position as shown in FIG. 4, a position in which extension 137 is not engageable by foot 122 when the camera is folded. The position of extension 137 and the return of the trim assembly to its predetermined normal position are predicated upon the position of a trim assembly return preventing mechanism shown generally at 164. Lockout mechanism 164 includes an L-shaped member 166 positioned for slidable movement between a first position shown in FIG. 4 and a second position shown in FIG. 3. L-shaped member 166 is biased toward a front wall portion 168 of film cassette 38 by a compression spring 170. Spring 170 is positioned between an interior boss member 172 formed within roller support structure 136 and a vertical wall portion 174 of member 166. When in its first position, member 166 abuts the front wall portion 168. Further rearward movement of member 166 under the influence of spring 170 when cassette 38 is removed is precluded by the engagement of a tab 176 formed on a lower forward portion of member 166 and a ramped portion 178 of roller bracket 138.

When member 166 is in its first position, extension 137 is mounted so as to permit it to rotate counterclockwise, under the influence of gravity, until it abuts the forwardmost portion of member 166. As a result, a foot engaging portion 180 of extension 137 is not in a position in which it can be engaged by foot 122 when camera 10 is folded. The situation described above, in which trim assembly 58 cannot be returned to its predetermined normal position, is a result of the employment of a cassette 38 whose film requires a given trim setting for correcting the film's exposure parameters in the camera's exposure control system due to film speed variations. The film speed of the film contained within different film cassettes may vary due to uncontrollable chemical variations during their manufacture. Consequently, each film cassette manufactured has either a "correct" film speed which requires no additional camera settings or an "incorrect" film speed which requires a minor manual adjustment to the trim assembly, thereby correcting for the minor deviation in the film speed. The film contained within cassette 38 shown in FIG. 4 is of a variety which included the minor deviation in film speed. In order to prevent the trim reset mechanism from returning the trim assembly to its predetermined normal position, the front wall portion of cassette 38 is produced without a "correct" film speed indicator or bump 182 (see FIG. 3). The absence of such a bump 182 is defined as a first indicator. Bump 182, formed as a second indicator, is positioned on a lower portion of the front wall 168 of cassettes whose film is "correct" and which requires no given trim setting for compensating for film speed variations inherent within the film.

A cassette including "correct" film and an indicator bump 182 is shown in FIG. 3. Indicator bump 182 is positioned on cassette 38 to engage vertical wall portion 174 of member 166 and move member 166 forwardly against the bias of spring 170. Forward movement of member 166 toward its second position (as shown in FIG. 3) moves extension 137 clockwise about pin 160 into a position in which foot engaging portion 180 of extension 137 is in a position in which it is engageable with foot 122 when camera 10 is closed.

Referring to FIGS. 1, 3 and 4, as camera 10 is folded, exposure control housing 18 is pivoted counterclockwise about axis 26, thereby pivoting hinge bracket 27 and its extension 29 about pin 31. Counterclockwise rotation of housing 18 and hinge bracket 27 continues until foot 122 is moved to a position in which it may engage extension 137 of light baffle 135. Since trim return is predicated upon "correct" film, (film whose cassette includes bump 182), it is assumed for purposes of explanatory clarity that the film being used is "correct" and a bump 182 is present.

Upon contacting extension 137, partially extending into slot 132, foot 122 and reset actuator 112 are rotated clockwise about pin 113 due to forces derived from the folding of camera 10. A clockwise rotation of actuator 112 causes cam surface 128 to rotate clockwise. Due to the engagement between surface 128 and pin 84, clockwise rotation of the former results in a camming action on pin 84 moving it along arcuate slot 108 to the right. This movement of pin 84 to the center slot also returns trim wedge 76 and trim assembly 58 to their respective normal positions.

Should cassette 38 contain film which requires a manual setting of the trim assembly to correct for minor film speed variations then bump 182 is not located on the cassette. In this absence, preventing member 166 is urged to the right (as seen in FIG. 4) and extension 137 is rotated counterclockwise to a position in which it cannot contact foot 122 of actuator 112, thereby preventing the automatic return of the trim assembly to its predetermined position after every camera folding. Trim assembly 58 will thereby remain in its trimmed state to compensate for the film speed variations in the film being used.

As may be evidenced from the foregoing, the automatic return of the trim assembly to its predetermined normal position in response to camera folding is additionally dependent upon what type of film is being employed within the camera. Film which has a "correct" film speed requires no given trim setting and the trim reset mechanism is allowed to operate. Film which is not "correct" however, requires manual trim settings to compensate for minor variations in its film speed and the trim reset mechanism is prevented from operating to return the trim assembly in response to camera folding.

While one preferred embodiment of the present invention has been described, it should be apparent that other specific embodiments of the invention are possible. Therefore, since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for exposing photosensitive material included within a container containing at least one sheet of such photosensitive material having a given film speed, such photosensitive material being of a variety which may require select changes in its exposure parameters due to film speed variations from said given film speed between different containers of such photosensitive material, said apparatus comprising:

housing means, said housing means adapted to receive a container containing at least one sheet of such photosensitive material, said container including a first indicator means when such photosensitive material contained within said container requires selective changes in its exposure parameters due to film speed variations, and a second indicator means when such photosensitive material contained within said container requires no selective changes in its exposure parameters;

control means for regulating the exposure of such photosensitive material, said control means including manually adjustable trim means movable from a predetermined normal position for selectively varying the regulation of said control means, said trim means being selectively movable to provide for said selective changes required in the exposure parameters of such photosensitive material when such photosensitive material has said film speed variations;

trim reset means for automatically returning said trim means to said predetermined normal position in response to a predetermined operation of said photographic apparatus when said container includes said second indicator means; and means for preventing said trim reset means from returning said trim means to said predetermined normal position when said container includes said first indicator means.

2. The photographic apparatus of claim 1 in which said preventing means is mounted in said housing means for movement between a first position in which said preventing means is in disenabling association with said trim reset means and said trim means is prevented from returning said trim means to said predetermined position, and a second position in which said preventing means is in enabling association with said trim reset means and said trim reset means is operative to return said trim means to said predetermined normal position subsequent to said predetermined operation of said photographic apparatus.

3. The photographic apparatus of claim 2 in which said preventing means is configured to move to said first position when a container including said first indicator means is received in said housing means and to move to said second position when a container including said second indicator means is received in said housing means.

4. The photographic apparatus of claim 3 in which said preventing means includes spring means for biasing said preventing means from said second position toward said first position.

5. The photographic apparatus of claim 4 in which said second indicator means is configured to move said preventing means from said first position to said second position against the bias of said spring means when a container including said second indicator means is received in said housing means.

6. The photographic apparatus of claim 5 in which said second indicator means is a physical discontinuity positioned on said container so as to engage a portion of said preventing means and move said preventing means from said first position to said second position when said container including said second indicator means is received in said housing means.

7. The photographic apparatus of claim 6 in which said second indicator means is a raised bump located on said container.

8. The photographic apparatus of claim 1 in which said trim reset means includes:

a trim reset actuator coupled with said trim means, said trim reset actuator being movable between a first position in which said trim means is in said predetermined normal postion and a second position in which said trim means is moved from said predetermined normal position; and contact means selectively engageable with said trim reset actuator for moving said trim reset actuator from said second position to said first position for returning said trim means to said predetermined normal position in response to said predetermined operation of said photographic apparatus, said contact means being mounted for movement between a first position in which contact means is out of engageable position with said trim reset actuator and a second position in which said contact means is in engageable position with said trim reset actuator, said preventing means being configured to position said contact means in said first position when said container includes said first indicator means and to further position said contact means is in its said second position when said container includes said second indicator means.

9. The photographic apparatus of claim 8 in which said preventing means is positioned for movement between said container and said contact means, said preventing means being movable between a first position in which said contact means is positioned at its first position and a second position in which said contact means is positioned at its second position, said preventing means being biased from its said second position toward its said first position.

10. The photographic apparatus of claim 9 in which photographic apparatus further includes means for rotatably mounting said contact means for movement from its second position to its first position, movement of said preventing means from its said first position to its said second position causing said contact means to move toward said second position, and movement of said preventing means from its second position to its first position causing said contact means to move to its first position.

11. Photographic apparatus for exposing photosensitive material, said apparatus comprising:

a plurality of housing members interconnected for movement between an erected configuration for forming an exposure chamber and a folded configuration, at least one of said housing members including means adapted to receive a container containing at least one sheet of such photosensitive material, said container including a first indicator means when such photosensitive material contained within said container requires selective changes in its exposure parameters due to film speed variations, and a second indicator means when such photosensitive material contained within said container requires no selective changes in its exposure parameters;

control means for regulating the exposure of such photosensitive material, said control means including manually adjustable trim means movable from a predetermined normal position for selectively varying the regulation of said control means, said trim means being selectively movable to provide for said selective changes required in the exposure parameters of such photosensitive material when such photosensitive material has said film speed variations;

trim reset means for automatically returning said trim means to said predetermined normal position in response to movement of said housing members from one of said configurations to the other of said configurations when said container includes said second indicator means; and means for preventing said trim reset means from returning said trim means to said predetermined normal position when said container includes said first indicator means.

12. The photographic apparatus of claim 11 in which said trim reset means includes:

a trim reset actuator coupled with said trim means, said trim reset actuator being movable between a first position in which said trim means is in said predetermined normal position and a second position in which said trim means is moved from said predetermined normal position; and contact means selectively engageable with said trim reset actuator for moving said trim reset actuator from said second position to said first position for returning said trim means to said predetermined normal position in response to movement of said housing members from one of said configurations to the other of said configurations, said contact means being mounted for movement between a first position in which contact means is out of engageable position with said trim reset actuator and a second position in which said contact means is in engageable position with said trim reset actuator when said housing members are moved from one of said configurations to the other of said configurations, said preventing means being movable to position said contact means in said first position when said container includes said first indicator means and to further position said contact means in said second position when said container includes said second indicator means.

13. The photographic apparatus of claim 12 in which said preventing means is positioned for movement between said container and said contact means, said preventing means being movable between a first position in which a portion of said preventing means is in abutting association with said first indicator means and said contact means is in its said first position and a second position in which said portion of said preventing means is in abutting association with said second indicator means and said contact means is in its said second position, said preventing means being biased from said second position to said first position.

14. The photographic apparatus of claim 13 in which said preventing means is movable from said first position to said second position against said bias when a container including said second indicator means is received in said means adapted to receive a container of such photosensitive material, said preventing means being movable from said second position to said first position under the influence of said bias when said container including said second indicator means is removed from said means adapted to receive a container of such photosensitive material, said preventing means being located in its first position when a container including a first indicator means is received in said means adapted to receive a container of such photosensitive material.

15. The photographic apparatus of claim 12 in which said photographic apparatus further includes a movable light shielding means for preventing actinic light from impinging on such photosensitive material during the movement of an exposed sheet of such photosensitive material from within said photographic apparatus to without said photographic apparatus, said light shielding means being pivotally coupled to one of said housing members, said contact means being pivotally mounted on said light shield means and movable into abutting engagement with said preventing means when said housing members are moved from said erected configuration to said folded configuration.

16. The photographic apparatus of claim 15 in which said preventing means is in abutting association with said contact means at one of its ends when said housing members are moved to said folded configuration, and in abutting association at its other end with said first indicator means when a container including said first indicator means is received within said means adapted to receive a container and with said second indicator means when a container including said second indicator means is received within said means adapted to receive a container.

17. The photographic apparatus of claim 16 in which said second indicator means is a raised bump located on said container in abuttable association with said other end of said preventing means when said container including said second indicator means is received in said means adapted to receive a container, said raised bump moving said preventing means and said contact means to their respective second positions in which said trim reset means automatically returns said trim means to said predetermined normal position in response to movement of said housing members from said erected configuration to said folded configuration.

18. The photographic apparatus of claim 16 in which said first indicator means is a flat portion located as a wall portion on said container in abuttable association with said other end of said preventing means when said container including said first indicator means is received in said means adapted to receive a container, said flat portion providing for the location of said preventing means and said contact means in their respective first positions in which said contact means is out of engageable position with said trim reset actuator when said housing members are moved to said folded configuration and said trim reset means is prevented from returning said trim means to said predetermined normal position in response to movement of said housing members from said erected to said folded configurations.

19. Apparatus for exposing photographic material comprising, in combination:

a cassette including:
    a cassette housing including means defining an exposure aperture; and
    a quantity of photographic material having a given film speed, said photographic material being positioned in underlying relationship with said means defining an exposure aperture, said photographic material being of a variety which may require selective changes in its exposure parameters due to film speed variations from said given film speed between different cassettes of said photographic material, said housing means including a first indicator means when said photographic material contained within said cassette requires selective changes in its exposure parameters due to film speed variations, and a second indicator means when said photographic material contained within said cassette has said given film speed and requires no selective changes in its exposure parameters; and a photographic camera including:
  a camera housing having a receiving chamber for removably retaining and positioning said cassette for photographically exposing an uppermost film unit through said means defining an exposure aperture;
  control means for regulating the exposure of said photographic material, said control means including manually adjustable trim means movable from a predetermined normal position for selectively varying the regulation of said control means, said trim means being selectively movable to provide for said selective changes required in the exposure parameters of said photographic material when said photographic material has said film speed variations;
  trim reset means for automatically returning said trim means to said predetermined normal position in response to a predetermined operation of said photographic camera when said cassette includes said second indicator means; and means for preventing said trim reset means from returning said trim means to said predetermined normal position when said cassette includes said first indicator means.

20. A film handling cassette for use with a photographic camera including control means for regulating the exposure parameters of such photographic camera, such control means including a manually adjustable trim assembly movable from a predetermined normal position for selectively varying the regulation of such control means, a trim assembly reset for automatically returning such trim assembly to its predetermined normal position in response to a predetermined operation of such photographic camera, and trim assembly reset preventing means movable between a first position for rendering such trim assembly reset inoperative to return such trim assembly to its predetermined normal position in response to such predetermined operation of such photographic camera and a second position for rendering such trim assembly operative to return such trim assembly to its predetermined normal position in response to such predetermined operation of such photographic camera, said film handling cassette comprising:

a housing; and
  a quantity of photosensitive material having a given film speed, said photosensitive material being of a variety which may require select changes in its exposure parameters due to film speed variations from said given film speed between different cassettes of said photosensitive material, said housing means including a first indicator means when said photosensitive material contained within said film handling cassette requires selective changes in its exposure parameters due to film speed variations, for cooperating with such trim assembly reset preventing means for selectively establishing such trim assembly reset preventing means in its first position when said photosensitive material has said given film speed, and a second indicator means when said photosensitive material contained within said film handling cassette has said given film speed and requires no selective changes in its exposure parameters, such trim assembly reset automatically returning such trim assembly to its predetermined normal position in response to such predetermined operation of such photographic camera when said film handling cassette includes said second indicator means.

21. The film handling cassette of claim 20 in which such preventing means is configured to move to its first position when said housing means includes said first indicator means and to move to said second position when said hosing means includes said second indicator means.

22. The film handling cassette of claim 21 in which such preventing means includes spring means for biasing such preventing means from said second position toward said first position.

23. The film handling cassette of claim 22 in which said second indicator means is configured to move such preventing means from its first position to its second position against the bias of such spring means when said housing means includes said second indicator means.

24. The film handling cassette of claim 23 in which said second indicator means is a physical discontinuity positioned on said housing means so as to engage a portion of such preventing means and move such preventing means from its first position to its second position when said housing means includes said second indicator means.

25. The film handling cassette of claim 24 in which said second indicator means is a raised bump located on said housing means.

26. The film handling cassette of claim 20 in which said trim assembly reset includes:
  a trim reset actuator coupled with such trim assembly, such trim reset actuator being movable between a first position in which such trim assembly is in its predetermined normal position and a second position in which such trim assembly is moved from its predetermined normal position; and
  contact means selectively engageable with such trim reset actuator for moving trim reset actuator from its second position to its first position for returning such trim assembly to its predetermined normal position in response to said predetermined operation of such photographic apparatus, such contact means being mounted for movement between a first position in which such contact means is out of engageable position with such trim reset actuator and a second position in which such contact means is in engageable position with such trim reset actuator, such preventing means being configured to position such contact means in its first position when said housing means includes said first indicator means and to further position such contact means is in its second position when said housing means includes said second indicator means.

27. the film handling cassette of claim 26 in which such preventing means is positioned for movement between said housing means and such contact means, such preventing means being movable between its first position in which such contact means is positioned at its first position and its second position in which such contact means is positioned at its second position, such preventing means being biased from its said second position toward its said first position.

* * * * *